(12) United States Patent
Fleming et al.

(10) Patent No.: US 6,344,068 B1
(45) Date of Patent: Feb. 5, 2002

(54) PROCESS FOR RECOVERING GOLD FROM THIOSULFATE LEACH SOLUTIONS AND SLURRIES WITH ION EXCHANGE RESIN

(75) Inventors: Christopher Fleming, Omemee; John Wells, Toronto; Kenneth G. Thomas, Mississauga, all of (CA)

(73) Assignee: Barrick Gold Corporation, Toronto (CA)

(*) Notice: Subject to any disclaimer, the term of this patent is extended or adjusted under 35 U.S.C. 154(b) by 0 days.

(21) Appl. No.: 09/542,736

(22) Filed: Apr. 4, 2000

(51) Int. Cl.[7] .............................................. C22B 3/24
(52) U.S. Cl. ........................ 75/736; 423/24; 423/561.1
(58) Field of Search .............................. 423/561.1, 24; 75/736; 205/66

(56) References Cited

U.S. PATENT DOCUMENTS

| | | | |
|---|---|---|---|
| 4,070,182 A | 1/1978 | Berezowsky et al. ......... | 75/103 |
| 4,269,622 A | 5/1981 | Kerley, Jr. .................... | 75/103 |
| 4,289,532 A | 9/1981 | Matson et al. ................ | 75/105 |
| 4,369,061 A | 1/1983 | Kerley, Jr. .................... | 75/103 |
| 4,384,889 A | 5/1983 | Wiewiorowski et al. ....... | 75/101 |
| 4,552,589 A | 11/1985 | Mason et al. ................. | 75/105 |
| 4,578,163 A | 3/1986 | Kunter et al. ................ | 204/110 |
| 4,654,078 A | 3/1987 | Perez et al. ................... | 75/118 |
| 4,723,998 A | 2/1988 | O'Neil .......................... | 75/101 |
| 4,738,718 A | 4/1988 | Bakshani et al. ............. | 75/105 |
| 4,765,827 A | 8/1988 | Clough et al. ................. | 75/2 |
| 4,801,329 A | 1/1989 | Clough et al. ................. | 75/97 |
| 4,816,235 A | 3/1989 | Pesic ........................... | 423/32 |
| 4,902,345 A | 2/1990 | Ball et al. ................. | 75/118 R |
| 4,923,510 A | 5/1990 | Ramadorai et al. ........... | 423/29 |
| 4,925,485 A | 5/1990 | Schulze ........................ | 423/22 |
| 5,071,477 A | 12/1991 | Thomas et al. ................ | 75/744 |
| 5,127,942 A | 7/1992 | Brierley et al. ............... | 75/743 |
| 5,215,575 A | 6/1993 | Butler ......................... | 75/744 |
| 5,236,492 A | 8/1993 | Shaw et al. ................... | 75/744 |
| 5,354,359 A | 10/1994 | Wan et al. .................... | 75/744 |
| 5,362,470 A * | 11/1994 | Masutomi et al. ........ | 423/561.1 |
| 5,536,297 A | 7/1996 | Marchbank et al. .......... | 75/736 |
| 5,785,736 A | 7/1998 | Thomas et al. ................ | 75/736 |
| 5,876,588 A * | 3/1999 | Lalancette et al. ............ | 423/24 |
| 6,180,080 B1 * | 1/2001 | Proulx et al. ............ | 423/576.6 |

OTHER PUBLICATIONS

PCT Application, International Publication No. WO 91/11539 dated Aug. 8, 1991.
PCT Application, International Publication No. WO 94/06944 dated Mar. 31, 1994.
Zipperian, et al., Gold and Silver Extraction by Ammoniacal Thiosulfate Leaching from a Rhyolite Ore, Jun. 1987.
Langhans, et al., Copper–catalyzed thisulfate leaching of low–grade gold ores, Dec. 1991.
Wan, et al., Thisulfate leaching following biooxidation pretreatment for gold recovery from refractory carbonaceous–sulfidic ore, Aug. 1997.

* cited by examiner

Primary Examiner—Melvyn Andrews
(74) Attorney, Agent, or Firm—Senniger, Powers, Leavitt & Roedel

(57) ABSTRACT

A process for recovering gold from thiosulfate leach solutions and slurries in which gold is loaded into an ion exchange resin. Gold is recovered from the resin by elution with polythionate ions and the resin is regenerated with sulfide or sulfite. Gold is recovered from the eluate by precipitation with sulfide ions, cementation or electrowinning. The invention also provides for a process of manufacturing polythionate ion solutions suitable for eluting gold from ion exchange resins.

67 Claims, 2 Drawing Sheets

PROCESS FOR RECOVERING GOLD FROM THIOSULFATE LEACH SOLUTIONS AND SLURRIES WITH ION EXCHANGE RESIN

BACKGROUND OF THE INVENTION

This invention relates to the recovery of gold from ores by thiosulfate leaching and, more particularly, to an ion exchange process for the recovery of gold from a thiosulfate leach solution or slurry.

Gold is typically recovered using conventional cyanidation technology. The pH is adjusted to between 10 and 11 with lime, and cyanide is added to solubilize the gold. Oxygen is dispersed through the slurry by agitation, and gold dissolves by the following reaction:

$$4Au + O_2 + 8CN^- + H_2O \rightarrow 4Au(CN)_2^- + 4O^-$$

In modern cyanidation circuits, the dissolved gold is typically adsorbed onto particles of activated carbon, either during the cyanide leach itself by carbon-in-leach (CIL) or following the leach by carbon-in-pulp (CIP). An alternate method of recovering gold from cyanide leach solutions is through zinc cementation and variations of the Merrill-Crowe process.

In addition to the locking of gold particles in sulfide minerals, a problem which must be addressed in the treatment of some ores is preg robbing. In carbonaceous ores, preg robbing occurs as active carbon indigenous to the ore has the ability to rob gold from the cyanide bearing leach solution, reducing recovery. Pressure oxidation can partially deactivate the indigenous carbon, but by itself is not sufficient for highly preg-robbing ores. To further reduce preg-robbing problems, blanking agents such as kerosene or sodium lauryl sulfate have been used to further deactivate carbon in the ore. Carbon-in-leach has been successful for mildly preg-robbing ores, as the activated carbon added to the slurry possesses adsorption kinetic characteristics superior to those of the indigenous carbon, allowing the gold to load onto the added carbon as soon as it is leached, before it can load onto the carbon in the ore. Carbon-in-leach alone, however, has not been completely successful in treating highly preg-robbing ores.

An additional problem in recovering gold from highly carbonaceous ores is that a significant quantity of the gold may have been adsorbed onto carbon during formation of the mineral deposit. This gold will only become available to a lixiviant which can remove it from the carbon. The use of a cyanide lixiviant alone has not been entirely successful in leaching gold locked in carbonaceous material.

Thiosulfate leaching of gold is a potentially attractive alternative to the conventional cyanidation process for at least three types of gold ore feed material. First, in gold ores that contain organic carbonaceous material, gold recovery by thiosulfate leaching is usually significantly higher because the gold thiosulfate complex is quite insensitive to preg robbing. Secondly, gold/copper ores are frequently not well suited to the cyanidation process owing to higher cyanide consumption by the copper mineralization in the ore, which leads to unacceptably high operating costs. Thiosulfate does not react as readily with copper minerals, and the lower reagent cost and consumption of thiosulfate compared to cyanide leads to potentially lower operating costs in these situations. Finally, there are certain gold ore bodies that cannot be treated by the conventional cyanidation process because they are located in environmentally sensitive areas. Thiosulfate leaching reduces the impact on the environment, as the chemicals used in this process are already used as fertilizers in the agriculture industry.

The thiosulfate leach process has been proven to be a technically viable process, with many aspects of the process disclosed in publications and patents. For example, Berezowsky et al., U.S. Pat. No. 4,070,182, disclose a process to leach gold from copper-bearing sulphidic material with ammonium thiosulfate, followed by cementation of the gold on zinc dust. Kerley Jr., U.S. Pat. Nos. 4,269,622 and 4,369,061, disclose using an ammonium thiosulfate leach solution containing copper to leach gold and silver from ores containing manganese. Perez et al., U.S. Pat. No. 4,654,078, disclose leaching gold and silver with a copper-ammonium thiosulfate lixiviant to produce a pregnant leach solution. Gold and silver are then precipitated onto a copper cement added to the pregnant leach solutions. Wan et al., U.S. Pat. No. 5,354,359, disclose leaching gold from preg robbing ores with a thiosulfate lixiviant followed by cementation or precipitation of the leached precious metal values. PCT application WO 91/11539 discloses recovering gold from a gold-loaded thiosulfate solution by adding cyanide to form a gold cyanide complex followed by adsorbing the gold cyanide complex onto a carbon or resin adsorbent. Thomas et al., U.S. Pat. Nos. 5,536,297 and 5,785,736, disclose a process for treating a refractory sulphidic and carbonaceous ore by pressure oxidation followed by thiosulfate leaching and adsorption of the gold thiosulfate complex on an ion exchange resin.

The processes that have been disclosed to extract gold from the thiosulfate leach liquors include cementation on zinc (Berezowsky, et al.) or copper (Perez et al., Wan et al.), conversion of gold thiosulfate to gold cyanide, followed by adsorption on activated carbon (PCT Application WO 91/11539), and adsorption on ion exchange resin (Thomas, et al). These processes are very efficient metallurgically, however, they each have limitations. For example, the cementation processes require that the leach slurry first be processed by filtration or counter-current decantation to separate the leach solution from the leached solids. This process is expensive and can result in appreciable gold losses due to re-precipitation or entrainment in the leached solids. The process disclosed in PCT Application WO 91/11539 also cannot be used to treat carbonaceous preg robbing feed materials without solid/liquid separation prior to final gold recovery.

The process disclosed by Thomas et al., can be used to recover gold thiosulfate from solutions or pulp without solid/liquid separation, and recovers gold efficiently from carbonaceous, preg robbing ores. However, thiocyanate salts are quite expensive, and significant losses of thiocyanate to the tailings can have a material effect on the overall economics of the process, as well as potentially creating environmental problems. In addition, because of the great affinity of the thiocyanate ion for ion exchange resins, it is important to regenerate the eluted resin, to displace thiocyanate, prior to recycling the resin to adsorption. Regeneration with sulfuric acid is effective, but this process increases operating costs and reduces resin life.

The process disclosed herein then, reveals an alternative method for recovering gold from thiosulfate leach solutions that can recover gold from ores, concentrates or other feed materials more economically than the conventional cyanidation process.

SUMMARY OF THE INVENTION

Among the several objects of the present invention, therefore, is the provision of a process for recovering gold from comminuted ores, concentrates or other feed materials wherein gold has been leached to form a gold-bearing thiosulfate leach solution or slurry; the provision of such a process wherein gold is recovered after contacting a gold-bearing thiosulfate leach solution or slurry with an ion exchange resin; and the provision of such a process wherein gold is recovered after contacting a gold-loaded ion exchange resin with polythionate ions. Another object is the provision of a process for manufacturing a polythionate ion solution for use in eluting gold from an ion exchange resin. A further object of the present invention is the provision of a process for the recovery of gold from polythionate eluate solutions.

Generally, therefore, the present invention is directed to a process for recovering gold from comminuted ore. The process comprises preparing an aqueous gold-bearing slurry comprising a solid ore residue, a thiosulfate lixiviant and an ion exchange resin. Gold is then transferred from the slurry to the ion exchange resin. The gold is then eluted from the resin by contacting the resin with polythionate ions to form a gold-bearing eluate from which gold is then recovered.

The present invention is further directed to a process for recovering gold from a thiosulfate leach solution containing a gold-bearing thiosulfate lixiviant. The process comprises contacting the leach solution with an ion exchange resin having an affinity for gold to adsorb gold on the resin. The resin is then contacted with polythionate ions to elute the gold, producing a gold bearing eluate from which the gold is recovered.

The present invention is still further directed to a process for manufacturing a polythionate ion solution for use in eluting gold from an ion exchange resin. The process comprises oxidizing thiosulfate to polythionate by contacting a thiosulfate solution with about 75 to about 100 percent of a stoichiometrically equivalent amount of an oxidant.

The present invention is still further directed to a process for recovering gold from a gold-bearing eluate resulting from the polythionate elution of a gold-loaded ion exchange resin. The process comprises contacting the eluate with a solution of sulfide ions to form an insoluble gold sulfide species.

These and other objects, features and advantages of the invention will become apparent from the following detailed description.

DETAILED DESCRIPTION OF THE INVENTION

Figure 1:
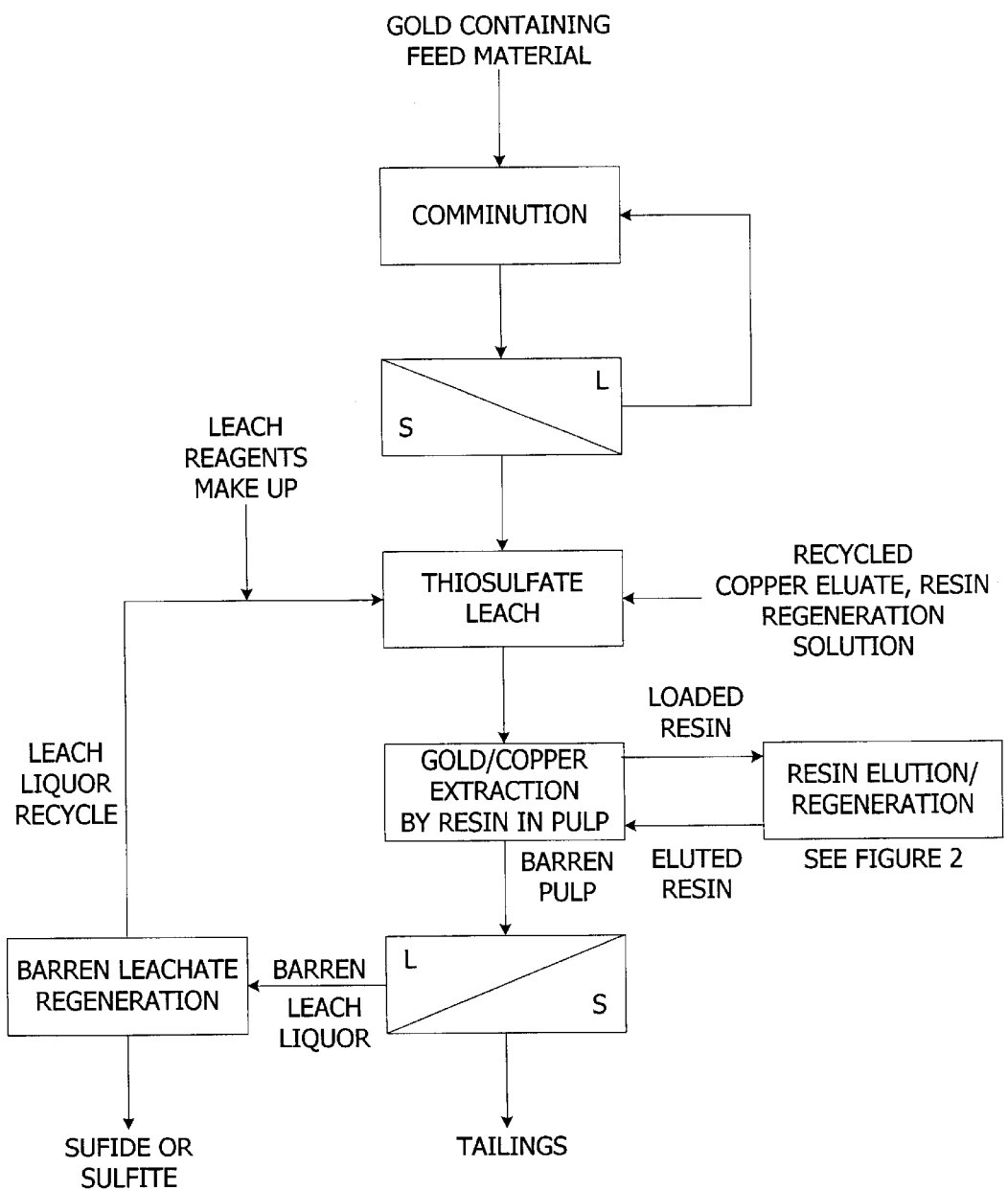
FIG. 1 is a flow diagram illustrating the overall process for one embodiment of the invention.

The feed material to this process is either a slurry or a solution from an auriferous ore containing the gold thiosulfate complex. For example, one potential feed material may be produced by the thiosulfate leaching process described hereunder.

Following pretreatment of the gold-containing ore or concentrate by processes such as grinding, pre-oxidation of sulfides, or pre-neutralization of acid produced during pre-oxidation as taught by Thomas et al., the feed slurry or solution passes to one or more leach tanks where thiosulfate lixiviant is added. The preferred lixiviant is ammonium thiosulfate solution, having between about 0.01 and 0.3 M thiosulfate ion, more preferably about 0.05 to about 0.25 M thiosulfate ion, and most preferably about 0.1 to about 0.2 M thiosulfate ion. Alternative embodiments employ soluble thiosulfate salts other than ammonium thiosulfate such as calcium thiosulfate or sodium thiosulfate. These alternatives may be preferred in jurisdictions where remediation of the tailings solution to remove ammonium ions is required. Leaching is performed in a stirred tank reaction system on a batch or continuous basis. In continuous mode, the stirred tank reaction system preferably comprises from one to twelve stages of mechanically agitated tanks arranged in series so that slurry flow cascades from one tank to the next by gravity. The leaching of gold is accomplished by oxidation of metallic gold and complexing with thiosulfate to form the gold thiosulfate complex, $Au(S_2O_3)_2^{3-}$, according to the following reaction:

$$2Au + \tfrac{1}{2}O_2 + 4S_2O_3^{2-} + H_2O \rightarrow 2Au(S_2O_3)_2^{3-} + 2OH^-$$

The slurry flowing through the leach tanks is between about 35 and 45% solids, preferably about 40% solids. A temperature of between about 25° C. and 60° C., preferably between about 45° C. and 60° C., most preferably between about 45° C. and 55° C. is maintained throughout leaching to promote rapid dissolution of gold to form the soluble $Au(S_2O_3)_2^{3-}$ complex. Higher temperatures have been found to accelerate leaching, but the temperature should be maintained below 60° C. to avoid degradation of reagents and damage to the ion exchange resin.

In addition to thiosulfate, the lixiviant solution preferably contains a catalyst, preferably cupric ion, to promote oxidation of the gold and subsequent solubilization as the thiosulfate complex. The cupric ion may be chemically reduced through reaction with thiosulfate, sulfite or gold.

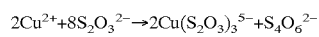
$$2Cu^{2+} + 8S_2O_3^{2-} \rightarrow 2Cu(S_2O_3)_3^{5-} + S_4O_6^{2-}$$

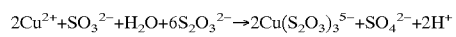
$$2Cu^{2+} + SO_3^{2-} + H_2O + 6S_2O_3^{2-} \rightarrow 2Cu(S_2O_3)_3^{5-} + SO_4^{2-} + 2H^+$$

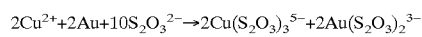
$$2Cu^{2+} + 2Au + 10S_2O_3^{2-} \rightarrow 2Cu(S_2O_3)_3^{5-} + 2Au(S_2O_3)_2^{3-}$$

The cupric ion is thought to exist in ammoniacal solution as the cupric tetrammine ($Cu(NH_3)_4^{2+}$) and the above equations can be modified to include this species. The gold leaching reaction is the desired reaction. The oxidation of thiosulfate is generally to be regarded as undesirable although it may be possible for the tetrathionate ($S_4O_6^{2-}$) to behave as an oxidant toward gold. As described below, sulfite has the role of a sacrificial reductant and reduces the rate of thiosulfate oxidation. Oxygen may react with the gold directly or it may react with the cuprous thiosulfate species to form a cupric tetrammine species, which subsequently oxidizes gold.

Direct Reaction:

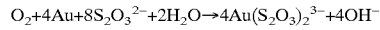
$$O_2 + 4Au + 8S_2O_3^{2-} + 2H_2O \rightarrow 4Au(S_2O_3)_2^{3-} + 4OH^-$$

Catalytic Mechanism:

Step 1. Cuprous oxidation by oxygen:

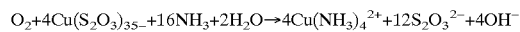
$$O_2 + 4Cu(S_2O_3)_{35-} + 16NH_3 + 2H_2O \rightarrow 4Cu(NH_3)_4^{2+} + 12S_2O_3^{2-} + 4OH^-$$

Step 2. Cupric leaching of gold:

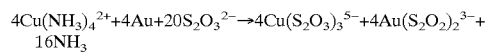
$$4Cu(NH_3)_4^{2+} + 4Au + 20S_2O_3^{2-} \rightarrow 4Cu(S_2O_3)_3^{5-} + 4Au(S_2O_2)_2^{3-} + 16NH_3$$

Overall:

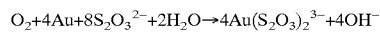
$$O_2 + 4Au + 8S_2O_3^{2-} + 2H_2O \rightarrow 4Au(S_2O_3)_2^{3-} + 4OH^-$$

Copper concentration should be maintained in the range of about 10 to about 1000 ppm, preferably between about 20 and about 250 ppm. If copper concentration is allowed to drop too low, gold recovery suffers. When sodium or calcium thiosulfate is used as the lixiviant, copper is maintained in solution by the addition of ammonia in an amount sufficient to ensure a minimum molar ratio of 4:1 $NH_3$:CU, preferably with about 10% excess ammonia, to form the stable copper complex, tetrammine copper sulfate. When ammonium thiosulfate is used as the lixiviant, the ammonium ion associated with the lixiviant salt generally provides more than enough ammonium ion strength to stabilize copper in solution. In addition to stabilizing copper in solution, the added ammonia may serve to adjust the pH of the leach slurry, as discussed below. It is contemplated that the source of ammonia may be ammonium sulfate salt added to the leach tanks or recycled ammonia recovered from the slurry or barren leachate after gold recovery as taught by Thomas et al.

The leaching reaction is normally conducted at a pH in the range of about 7 to about 10. The rate of the leaching reaction tends to increase at higher pH, but so too does the undesired loss of ammonia due to volatilization from air-agitated leach tanks and the resulting precipitation of gold and copper. Therefore, the pH of the leaching reaction should be maintained within the range of about 7 to about 10, preferably from about 7.5 to about 9.5, and most preferably from about 8 to about 9.

As an optional measure to minimize reagent loss and minimize reduction in gold recovery through oxidation of thiosulfate to tetrathionate, trithionate, sulfate and other oxidized species, sulfite can be added to the leach slurry in the form of sodium metabisulfite or sulfur dioxide at concentrations in the range of about 0.001 M to 0.1 M, more preferably about 0.01 M to 0.05 M. Under oxidizing conditions, reagent loss can occur by oxidation of thiosulfate by the following reaction:

$$2(NH_4)_2S_2O_3 + \tfrac{1}{2}O_2 + H_2O \rightarrow (NH_4)_2S_4O_6 + 2NH_4OH$$

Added ammonium sulfite reduces tetrathionate to thiosulfate by the following reaction:

$$(NH_4)_2SO_3 + 2NH_4OH + (NH_4)_2S_4O_6 \rightarrow (NH_4)_2S_2O_3 + (NH_4)_2SO_4 + H_2O$$

The thiosulfate equilibrium with sulfite and sulfide is as follows:

$$6H^+ + 4SO_3^{2-} + 2S^{2-} \leftrightarrow 3S_2O_3^{2-} + 3H_2O$$

such that without added sulfite the equilibrium is shifted to the left, which favors the precipitation of gold sulfide. Sulfite addition therefore stabilizes the lixiviant and improves gold recovery.

After leaching, the slurry containing the gold-bearing lixiviant solution and solid residue, or the leach solution containing the gold thiosulfate complex, is fed to a gold recovery operation as shown in FIG. 1. In the preferred embodiments of the gold recovery process, the gold-bearing lixiviant and solid residue are subjected to resin-in-pulp (RIP) or resin-in leach (RIL) recovery of both the gold and some or all of the copper.

One preferred embodiment, RIP, employs from one to twelve leach tanks with an overall residence time of about 2 to 48 hours, followed by from 4 to 8 RIP tanks with an overall residence time of about 6 to 12 hours. The optimum residence time in leaching varies over a wide range of about 2 to 48 hours and is influenced primarily by the size of the gold particles in the feed material. For example, gold particles that are hosted in refractory sulfide minerals such as pyrite and arsenopyrite are typically extremely fine, usually less than 1 micron in diameter. These gold particles, once liberated by a sulfide oxidation process such as pressure leaching, typically leach very rapidly in thiosulfate solution (less than about 2 hours). Larger gold particles, such as those that are greater than about 10 to 20 microns in diameter, can take up to about 48 hours to be leached efficiently in thiosulfate lixiviant. To a lesser extent, other leaching conditions such as pH, temperature and the concentration of reagents may also affect the required residence time. In addition, reducing agents, such as reactive sulfide minerals, in the gold feed material may inhibit the leaching of gold. Because the leaching of gold is accomplished by oxidation of metallic gold, reducing agents compete with the gold leaching reaction by reducing the oxygen available in solution, thus slowing the leaching of gold.

The thiosulfate lixiviant and the copper are added to the leach tanks, either all into the first leach tank or, preferably, incrementally into the first several (2 to 4) leach tanks. The sulfite ion can then be added to either the last leach tank or to the last 2 or 3 leach tanks, to reduce trithionate and tetrathionate back to thiosulfate (plus sulfate) prior to RIP. This is important when appreciable concentrations of trithionate and tetrathionate have been produced during the leaching reaction, because these ions load strongly onto ion exchange resins in competition with the gold and copper thiosulfate complexes, thereby reducing the loading capacity of the resin for gold and copper.

A second preferred embodiment, RIL, differs only in that resin is present in the leaching tanks. This variation of the RIP process is suited to ores that contain very fine (less than 1 micron) gold particles, which have very fast leaching rates as discussed above. In the RIL embodiment, the thiosulfate leaching operation and adsorption onto resin operation are effected simultaneously, such that the thiosulfate lixiviant first contacts the ore slurry in the presence of the resin.

An alternative embodiment to RIP or RIL is resin-in-solution (RIS). In the RIS process, after leaching, the gold-bearing lixiviant solution is separated from the slurry containing the gold-bearing lixiviant solution and the solid residue by either filtration or counter-current decantation. The separated gold-bearing lixiviant solution is then contacted with ion exchange resin to recover the gold and copper thiosulfate.

In both the RIP and RIL operations, the lixiviant and the solid residue are contacted with an ion exchange resin, and in the RIS operation, only the lixiviant solution is contacted with the resin. In all three of the resin operations contemplated by this invention, the resin is preferably a strong base resin consisting of a quaternary amine attached to a polymer backbone (e.g. polystyrene beads). A strong base resin is preferred over a weak base resin because, while a strong base resin's effectiveness is not dependent on environmental pH, a weak base resin typically requires a slurry or solution pH of less than 7. The capacity of a typical strong base resin is also greater than that of a weak base resin, such that a lower volume of resin is required. Furthermore, because strong base resins are more widely used, they are typically more available and thus, more economical than weak base resins. Gel resins and macroporous resins are both suitable, with macroporous resins being preferred because they are more durable.

The preferred resin comprises beads of at least about 0.8 mm in average diameter to facilitate screening. Suitable resins include all commercial strong-base resins of either Type I (Triethylamine functional groups), or Type II (triethyl ethanolamine functional groups), particularly those that are based on a macroporous matrix of polystyrene, cross-linked with 8–10% divinyl benzene. Specific strong-base ion exchange resins commercially available for use in this invention include Dowex-41 and Dowex MSA-1 (Type I), Dowex-42 and Dowex MSA-2 (Type II), which are manufactured by Dow Chemical; Amberlite IRA900C, Amberlite IRA-904 (Type I), and Amberlite IRA-910 (Type II), which are manufactured by Rohm & Haas; and A500 and A500 UC manufactured by Purolite. Also satisfactory are the Lewatit-600 resins; MP500, which is manufactured by Bayer; and the gel-type resin 21K, manufactured by Dow Chemical.

The RIP and RIL operations are carried out in a stirred tank reactor vessel or, preferably in a Pachuca tank, that being an air-agitated, conical-bottom, solid-liquid mixing vessel in which the air is injected into the bottom of the cone. An advantage of the Pachuca system is reduced resin bead breakage and improved dispersion of the resin beads in the slurry as compared to mechanically agitated systems. The RIP recovery is preferably carried out in four or more tanks connected in series, more preferably between four and eight such Pachuca tanks. The total residence time of the pulp is up to about twelve hours, with about 30 to 60 minutes per stage preferred. In one preferred embodiment, the volume of resin in each stage is between about 1 and 10 percent of the total volume of the tank, and the resin is moved from stage to stage counter-currently to the pulp at a rate such that the volumetric ratio of leach solution flow rate to resin flow rate is between about 250 and about 1000. Resin is advanced by pumping or air-lifting both the resin and pulp to the next stage of the adsorption train. The loaded resin exiting the first adsorption stage is pumped or airlifted to a horizontal, vibrating screen or to a static, sieve-bend screen, to separate and wash the loaded resin from entrained pulp.

The RIS operation can be carried out in continuous ion exchange (CIX) columns or in tanks, where agitation of the resin in the lixiviant solution is provided by fluidizing a bed of resin beads with lixiviant solution flowing upwards through the resin bed.

The pulp and barren lixiviant exiting the final RIP, RIL or RIS stage are sent to tailings for optional further treatment and reclaim. For example, in one embodiment, the tailings solution can be recovered and recirculated to the leaching step of the process. The solution is treated with sulfite ion or sulfide ion to reduce the trithionate and tetrathionate ions produced during the leaching reaction back to thiosulfate, so that the tailings solution becomes an effective lixiviant and thiosulfate consumption in the process is minimized. As a further alternative, the barren lixiviant may be processed through an ammonia recovery operation before recycle as taught by Thomas et al.

Figure 2:
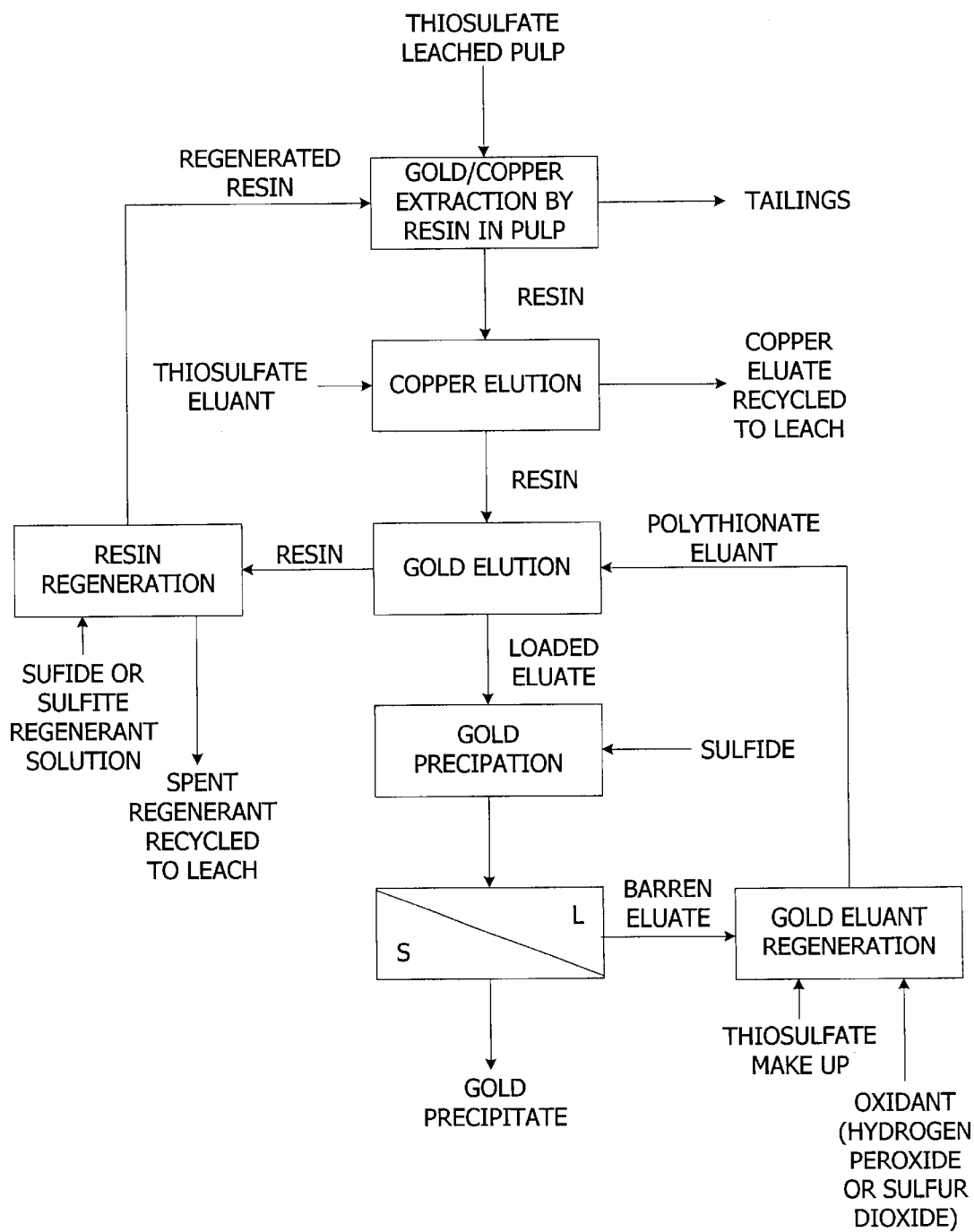
FIG. 2 is a flow diagram illustrating the elution and gold recovery process for one embodiment of the invention.

The loaded resin from the RIP, RIL or RIS operations of this invention is sent to an elution stage for elution of copper and gold therefrom as shown in FIG. 2. The loaded resin passes from the first adsorption stage of the RIP, RIL or RIS process to a screen as above, wherein the resin is separated from the solution or slurry and washed with a water spray. The wet, but drained resin then passes to the elution column.

Copper is eluted from the resin as taught by Thomas, et al. with a solution of thiosulfate ions. An ammonium thiosulfate solution having a concentration of about 100 to 200 g/L has been found to be especially effective for copper elution. Calcium or sodium thiosulfate solutions of equivalent thiosulfate strength are equally effective. After elution, the eluate containing ammonium thiosulfate and copper (about 500 to 1500 ppm) is then recycled to the leaching operation. The thiosulfate in the eluant needed to elute greater than about 95% of the copper from the resin will generally be less than the amount of thiosulfate needed to make up for thiosulfate losses in the tailings and losses due to thiosulfate oxidation. As revealed in the process of Thomas, et al., the elution of copper with thiosulfate is very selective in that the process elutes less than about 5% of the gold from the resin.

After copper elution, gold is eluted from the resin with a solution of polythionate ions as shown in FIG. 2. A solution of trithionate ions is the preferred eluant for the gold elution step. Alternatively, the eluant can be tetrathionate or a mixture of tetrathionate and trithionate ions. Both trithionate and tetrathionate have been found to be almost equally effective as eluants for gold thiosulfate on strong base resin. In practice, it is possible to synthesize a solution of trithionate that contains no tetrathionate; but in most cases, attempts to synthesize either trithionate and tetrathionate economically will result in the production of a solution containing both ions. Further, the ratio of trithionate to tetrathionate in the eluant solution has been found to have minimal effect on gold elution efficiency, thus an eluant of either trithionate ions, tetrathionate ions or a mixture of the two should be equally effective in the process of the present invention.

It has been found that just about any concentration of a polythionate ion solution can be used to elute gold from the resin. For example, solutions having a concentration of about 1 g/L to the saturation of trithionate and tetrathionate are contemplated as feasible for gold elution. However, the polythionate ion solution preferably has a concentration of about 20 to about 250 g/L, more preferably about 50 to about 200 g/L.

The reactions depicting the elution of gold thiosulfate from a strong base resin with tetrathionate and trithionate are shown below:

a) Tetrathionate

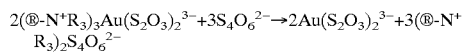

b) Trithionate

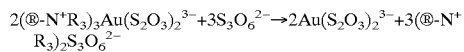

where the symbol ® represents the resin.

Both eluants are very efficient, achieving greater than about 99% gold elution under ambient conditions in about 4 to 12 hours, using between about 2 to about 20 bed volumes (BV) of eluant solution (about 50 to 200 g/L of either trithionate, tetrathionate or a mixture of both).

When the elution of gold is complete, the resin functional sites are occupied by polythionate ions and it is undesirable to return the resin directly to RIP, RIL or RIS adsorption in this form because these ions will suppress the loading of gold thiosulfate and copper thiosulfate on the resin. The resin can therefore be regenerated as shown in FIG. 2 with either sulfite ions or sulfide ions to reduce the polythionate ions to thiosulfate and sulfate ions. Since thiosulfate and sulfate ions have a low affinity for ion exchange resins compared to gold thiosulfate and copper thiosulfate, the resin can be returned to RIP, RIL or RIS adsorption in this regenerated form.

The reactions for the reduction of tetrathionate and trithionate with sulfite are shown below:

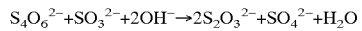

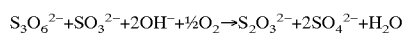

The reactions for the reduction of tetrathionate and trithionate with sulfide are shown below:

$$4S_4O_6^{2-}+2S^{2-}+6OH^-\rightarrow 9S_2O_3^{2-}+3H_2O$$

$$S_4O_6^{2-}+S_2^-\rightarrow 2S_2O_3^{2-}+S^0$$

$$S_3O_6^{2-}+S_2^-\rightarrow 2S_2O_3^{2-}$$

The reactions with sulfide will be preferred in most cases as a higher percentage of the tetrathionate and trithionate is converted to a useful product (thiosulfate). If the eluted resin contains tetrathionate ions or a mixture of tetrathionate and trithionate ions, the sulfide regeneration method should only be used in conjunction with alkali addition, to avoid the production of elemental sulfur, which would become trapped in the pores of the resin and adversely affect the ion adsorption properties of the resin.

After regeneration, the resin and regeneration product solution are separated by screening and washing. The regenerated resin is returned to RIP, RIL or RIS and the regeneration product solution, which contains mostly thiosulfate ions, is recycled to the thiosulfate leaching step, as shown in FIG. 2. In an alternative embodiment utilizing RIL, it is contemplated that the regenerated resin can be returned to the thiosulfate leaching step along with the regeneration product solution, without solid-liquid separation, as the ion exchange resin is typically contacted with the thiosulfate lixiviant and the gold ore or slurry simultaneously during the leaching of gold.

After elution from the resin, gold is recovered from the polythionate eluate solution. In a preferred embodiment as shown in FIG. 2, gold is recovered from the eluate solution with the addition of a solution of sulfide ions, which react with the gold thiosulfate complex to form an insoluble gold species. The addition of sulfide ions can also result in side reactions in which trithionate and tetrathionate are reduced back to thiosulfate, as shown in the equations above. In this case, these side reactions are undesirable, so the amount of sulfide added should be limited to such amount which is sufficient to precipitate the gold. As part of the present invention, it has been found that sulfide ions will precipitate gold from other soluble complex forms. For example, in addition to precipitating gold from a polythionate ion solution, sulfide ions can be used to precipitate gold from thiocyanate eluate solutions, such as gold thiosulfate that has been eluted from a strong base resin with thiocyanate as taught by Thomas et al.

In another preferred embodiment, gold is recovered from the eluate solution by reducing the gold thiosulfate back to gold metal by cementation on iron. Alternatively, the cementation process can be carried out with zinc, copper or aluminum powder, or by reduction in solution with sodium borohydride.

In an alternative embodiment, gold is recovered from the trithionate or tetrathionate eluate solution by electrolysis. However, electrowinning is less preferred because trithionate, tetrathionate and thiosulfate tend to be co-reduced (with gold (1)) at the cathode to produce elemental sulfur, which interferes with the efficient continued operation of the electrowinning circuit. Likewise, trithionate, tetrathionate and thiosulfate can also be wastefully oxidized to sulfate ions at the anode.

In all of the above embodiments, the eluate solution entering the processes for gold recovery will typically contain between about 100 and 500 ppm gold, about 50 to 200 g/L trithionate and/or tetrathionate, plus about 5 to 50 g/L thiosulfate at a neutral pH of about 6 to about 8 and an ambient temperature of about 15° C. to about 30° C. After the recovery of gold therefrom, the barren eluate solution can be reused in the generation of gold eluant as shown in FIG. 2 and discussed below.

In order to practice the process of this invention economically, it is necessary to manufacture polythionate salts at reasonable cost. As part of the development of the overall process, it has been found that thiosulfate can be oxidized to trithionate or tetrathionate using reasonably inexpensive oxidants such as hydrogen peroxide and sulfur dioxide. For example, it has been found that suitable polythionate ion solutions can be manufactured by contacting a thiosulfate solution with about 75 to about 100 percent of a stoichiometrically equivalent amount of such an oxidant.

In a preferred embodiment, the reaction between thiosulfate and hydrogen peroxide produces trithionate, as shown below:

$$3S_2O_3^{2-}+4H_2O_2+2H^+\rightarrow 2S_3O_6^{2-}+5H_2O$$

The product solution typically contains trithionate, a small amount of unreacted thiosulfate and a small amount of sulfate, resulting from the further oxidation of trithionate with hydrogen peroxide. Typically, no tetrathionate is produced. For example, starting with a feed solution containing between about 100 and 300 g/L thiosulfate and adding the stoichiometric amount of hydrogen peroxide according to the equation above, it is possible to produce a solution containing about 100 to about 200 g/L trithionate, about 10 to about 50 g/L sulfate and less than about 1 g/L tetrathionate. It is not necessary to add acid to drive the reaction, but if no acid is added, the pH of the final solution will be greater than about 10. If acid is added to control the pH in the acidic region (pH less than about 4), a significant portion of the thiosulfate is oxidized to tetrathionate, according to the following reaction, and the product solution contains a mixture of trithionate and tetrathionate. The reaction producing tetrathionate is as follows:

$$2S_2O_3^{2-}+H_2O_2+2H^+\rightarrow S_4O_6^{2-}+2H_2O$$

It is desirable that some residual unreacted thiosulfate remain to ensure that excess oxidant is not added which would otherwise wastefully oxidize trithionate to sulfate ions. However, the polythionate ion solution should contain less than about 100 g/L thiosulfate so as not to limit the solubility of trithionate and tetrathionate in the eluant.

Another preferred embodiment uses sulfur dioxide to oxidize thiosulfate to trithionate and tetrathionate. The reactions take place according to the following equations:

$$3S_2O_3^{2-}+2SO_2+2H^+\rightarrow 2S_4O_6^{2-}+H_2O$$

$$S_2O_3^{2-}+4SO_2+2OH^-\rightarrow 2S_3O_6^{2-}+H_2O$$

For example, it has been found that oxidation of a thiosulfate solution having a concentration of about 100 to about 300 g/L thiosulfate with the stoichiometric amount of sulfur dioxide as in the above equation always produces a mixture of about 50 to 150 g/L trithionate and about 50 to 150 g/L tetrathionate, even at alkaline pH values. Although there is no advantage in doing so, it is possible to increase the ratio of tetrathionate to trithionate by adding acid and maintaining a pH of less than about 2, but even under these conditions, significant amounts of trithionate are also produced. Lowering the pH is a less preferred reaction because of the wasteful addition of acid, since there is no advantage in terms of enhanced gold elution.

In an alternative embodiment, the thiosulfate solution can be treated with oxidants such as bromine and iodine to produce a solution containing mainly tetrathionate plus a small amount of trithionate.

$$2S_2O_3^{2-} + I_2 + 2H^+ \rightarrow S_4O_6^{2-} + 2I^-$$

However, because of the high cost of bromine and iodine, this process does not compete favorably with the hydrogen peroxide and sulfur dioxide oxidation processes.

The choice of whether hydrogen peroxide is used as the oxidant to make trithionate from thiosulfate or sulfur dioxide is used as the oxidant to make a mixture of trithionate and tetrathionate from thiosulfate will depend upon the relative costs of hydrogen peroxide and sulfur dioxide and the desirability of making either a pure trithionate eluant or a mixed trithionate plus tetrathionate eluant; however, as mentioned above, both trithionate and tetrathionate have been found to be equally effective as eluants for gold thiosulfate on strong base resin and, in most cases, an eluant of either trithionate ions, tetrathionate ions or a mixture of the two can be equally effective in the process of the present invention

EXAMPLE 1

A gold eluant solution was prepared by treating an aqueous solution (1.5 L) containing thiosulfate (330 g/L as the sodium salt) with a 50% hydrogen peroxide solution 405 g), which represented the stoichiometric amount of hydrogen peroxide needed to convert all thiosulfate to trithionate. The peroxide was added slowly to the thiosulfate solution and the pH was maintained at about 6 by adding a sufficient amount of a concentrated sulfuric acid solution. Once all the hydrogen peroxide had been added, the thiosulfate concentration had decreased from 330 to 106 g/L. Trithionate (224 g/L), tetrathionate (72 g/L) and sulfate (67 g/L) had been produced resulting in 67% of the $S_2O_3$ being converted beneficially.

EXAMPLE 2

A sample of strong base resin, A500, manufactured by Purolite (about 700 mL), was loaded by contacting the resin with a solution containing the gold thiosulfate and copper thiosulfate complexes (about 15 L). The initial concentrations of gold and copper in solution were about 50 mg/L and about 450 mg/L respectively. After 16 hours of treatment, the concentration of gold in solution had decreased to 0.25 mg/L, the concentration of copper in solution had decreased to 34 mg/L, and the resin was loaded to a level of 2955 g/t gold and 23,500 g/t copper.

The loaded resin was first treated at ambient temperature with an eluant solution (approximately 4 resin bed volumes) containing ammonium thiosulfate (about 200 g/L) for a period of 2 hours to elute the copper on the resin. This resulted in the elution of 97.4% of the copper and only 0.4% of the gold from the resin, producing an eluate containing copper (about 3200 mg/L) and gold (1.3 mg/L), and a partially eluted resin containing gold (3040 g/t) and copper (600 g/t).

The partially eluted resin was then treated at ambient temperature with the eluant produced in Example 1 (approximately 6 resin bed volumes), containing trithionate (about 224 g/L) and tetrathionate (about 72 g/L), to elute the gold. After 3 hours, 99.9% of the gold was eluted from the resin, producing an eluate containing gold (about 192 mg/L) and copper (about 40 mg/L), and an eluted resin containing minimal gold (about 2 g/t) and copper (less than about 50 g/t).

EXAMPLE 3

An alternative gold eluant solution was prepared by treating an aqueous solution (about 1.5 L) containing thiosulfate as the sodium salt (about 330 g/L) with about 356 g of bromine (115 mL of a 99.5% solution), which represented the stoichiometric amount of bromine needed to convert all thiosulfate to tetrathionate. There was no adjustment of the pH during bromine addition, and the pH decreased from 7.9 to 0.1 in the test. After the addition of bromine was complete, the final solution contained tetrathionate (about 80 g/L), trithionate (about 45 g/L) and sulfate (about 12 g/L), as well as elemental sulfur (about 96 g/L). There was no thiosulfate left in solution. After filtering off the elemental sulfur, the solution was tested as an eluant for gold.

The conditions of Example 2 were duplicated to produce a similar sample of loaded resin for the second elution test. After eluting the copper with ammonium thiosulfate (about 200 g/L) under exactly the same conditions as in Example 2, the partially eluted resin was then treated at ambient temperature with the above alternative gold eluant (approximately 6 resin bed volumes) containing tetrathionate (about 80 g/L) and trithionate (about 45 g/L), over a period of 3 hours. This treatment resulted in the elution of 99.2% of the gold from the resin, producing an eluate containing gold (about 254 mg/L) and copper (about 46 mg/L), and an eluted resin containing gold (about 24 g/t) and copper (less than 100 g/t).

EXAMPLE 4

The following test was carried out to produce a concentrated solution of trithionate ions:

An aliquot of aqueous solution (about 500 mL) containing thiosulfate as the sodium salt (about 225 g/L) was treated with the stoichiometric amount of hydrogen peroxide (135 g of 30% $H_2O_2$) required to convert all of the thiosulfate to trithionate (1.33 moles $H_2O_2$ per mole $S_2O_3$). The pH of the solution was not adjusted and increased from pH 6 at the start of the experiment to pH 11 at the end.

The final solution contained trithionate (about 163 g/L) and sulfate (about 60 g/L), as well as unreacted thiosulfate (about 56 g/L). Thus, 64% of the thiosulfate was converted to the desired trithionate product and 36% of the thiosulfate was converted to the wasteful sulfate product. There was no tetrathionate in the product (less than 0.1 g/L).

EXAMPLE 5

The eluted resin product from the test described in Example 3 was treated with sodium hydrogen sulfide (NaSH) to reduce the trithionate on the resin back to thiosulfate. The sulfide was added at the stoichiometric amount (1 mole NaSH per mole trithionate), and the solution was adjusted to pH 10 with NaOH after addition of NaSH.

The final solution contained thiosulfate (about 205 g/L) and sulfate (about 59 g/L), with no tetrathionate (less than 0.1 g/L), trithionate (less than 0.1 g/L) or sulfide (less than about 0.1 mg/L) remaining.

EXAMPLE 6

The following test was carried out to produce a concentrated solution of tetrathionate ions:

An aliquot of aqueous solution (about 500 mL) containing thiosulfate as the sodium salt (about 210 g/L) was treated with the stoichiometric amount of iodine (0.5 mole $I_2$ per mole of $S_2O_3$) required to convert all the thiosulfate to tetrathionate. NaOH was added to maintain a pH of about 8.

The final solution contained tetrathionate (about 136 g/L), trithionate (about 38 g/L) and sulfate (about 13 g/L), with little unreacted thiosulfate (only 3 g/L). The conversion of thiosulfate to tetrathionate and trithionate was 80% efficient.

EXAMPLE 7

The product of the test described in Example 6 was treated with sufficient NaSH to reduce the tetrathionate back to thiosulfate, (i.e. an addition of 1 mole NaSH per mole of tetrathionate).

The final solution contained thiosulfate (about 185 g/L) and some tetrathionate (less than about 1 g/L). The trithionate concentration had not decreased at all (29 g/L to 31 g/L), showing that the NaSH reacts preferentially with tetrathionate ions. The final product also contained a precipitate of elemental sulfur (equivalent to 31.8 g sulfur per liter of solution).

EXAMPLE 8

The following test was carried out to produce a concentrated solution of trithionate and tetrathionate ions by oxidation of thiosulfate with sulfur dioxide:

An aliquot of aqueous solution (about 1000 mL) containing thiosulfate as the sodium salt (about 200 g/L) was treated with $SO_2$ gas to oxidize the thiosulfate to trithionate and tetrathionate. The stoichiometric amount of $SO_2$ needed to oxidize all the thiosulfate to trithionate (4 moles $SO_2$ per mole of thiosulfate, or 2.3 g $SO_2$/g $S_2O_3$) was added over a period of 12 hours. The pH was not adjusted, and decreased during the test from 8.5 to 0.9.

At the end of the test the thiosulfate concentration had decreased (from 200 g/L to 39 g/L (81% conversion)), and the product solution contained trithionate (about 167 g/L) and tetrathionate (about 106 g/L). In total, 74% of the thiosulfate was converted to useful products (trithionate and tetrathionate), while 81% of the $SO_2$ gas added during the experiment actually went towards producing trithionate and tetrathionate.

It is anticipated that the efficiency of this laboratory-scale reaction could be further improved with the design of a more practical and efficient gas-liquid dispersion reactor.

EXAMPLE 9

To demonstrate the beneficial effect of regenerating the resin with sulfide ions after elution, a sample of strong base resin was fully loaded with a mixture of tetrathionate and trithionate ions. Three samples of this resin were then treated as follows:

1) The first sample was regenerated with sulfide ions by soaking the resin sample in an aqueous solution of sodium sulfide containing 1.2 times the stoichiometric amount of sulfide needed to reduce all the tetrathionate and trithionate to thiosulfate.

2) The second sample was treated as above, except regeneration was carried out with 0.7 times the stoichiometric amount of sulfide needed to reduce all the tetrathionate and trithionate to thiosulfate.

3) The third resin sample was not regenerated.

The three resin samples were then used to extract gold from a thiosulfate leach solution and the gold loading capacities were compared. As an example of the relative gold capacities at equilibrium, the unregenerated resin (sample number 3) attained a loading of 2200 g/t gold in contact with 21 mg/L gold in solution (D~400), while the resin regenerated with 0.7 times the stoichiometric amount of sulfide (sample number 2) loaded 2400 g/t gold in contact with 5.5 mg/L gold in solution (D~440), and the resin regenerated with 1.2 times the stoichiometric amount of sulfide (sample number 1) loaded 2700 g/t gold in contact with 0.4 mg/L gold in solution (D~6750) or 4900 g/t gold from 5.0 mg/L gold in solution (D~1000).

What is claimed is:

1. A process for recovering gold from comminuted ore, the process comprising:
   preparing an aqueous gold-bearing slurry comprising a solid ore residue, a thiosulfate lixiviant and an ion exchange resin;
   transferring gold to said ion exchange resin in said slurry;
   eluting gold from said resin by contact thereof with polythionate ions to produce a gold-bearing eluate; and,
   recovering gold from the gold-bearing eluate.

2. The process of claim 1 wherein said ion exchange resin is added to said aqueous gold-bearing slurry about 2 to about 48 hours after said thiosulfate lixiviant.

3. The process of claim 1 wherein gold is recovered from the gold-bearing eluate by cementation with iron, zinc, copper, aluminum or reduction in solution with sodium borohydride.

4. The process of claim 1 wherein gold is recovered from the gold-bearing eluate by electrowinning.

5. The process of claim 1 wherein gold is recovered from the gold-bearing eluate by precipitation with sulfide ions.

6. The process of claim 1 wherein said ion exchange resin is a strong-base resin.

7. The process of claim 1 wherein said ion exchange resin is a weak base resin.

8. The process of claim 1 wherein said ion exchange resin is contacted with a polythionate ion solution having a concentration of about 20 g/L to about 250 g/L trithionate.

9. The process of claim 8 wherein said polythionate ion solution is prepared by contacting a thiosulfate solution with about 75 to about 100 percent of a stoichiometrically equivalent amount of an oxidant to oxidize thiosulfate to polythionate.

10. The process of claim 8 wherein said polythionate ion solution contains less than about 100 g/L thiosulfate.

11. The process of claim 1 wherein said ion exchange resin is contacted with a polythionate ion solution having a concentration of about 20 g/L to about 250 g/L tetrathionate ions.

12. The process of claim 11 wherein said polythionate ion solution is prepared by contacting a thiosulfate solution with about 75 to about 100 percent of a stoichiometrically equivalent amount of an oxidant to oxidize thiosulfate to polythionate.

13. The process of claim 11 wherein said polythionate ion solution contains less than about 100 g/L thiosulfate.

14. The process of claim 1 wherein said ion exchange resin is contacted with a polythionate ion solution comprising a mixture of trithionate and tetrathionate ions, said mixture having a concentration of about 20 g/L to about 250 g/L trithionate and tetrathionate ions.

15. The process of claim 14 wherein said polythionate ion solution is prepared by contacting a thiosulfate solution with about 75 to about 100 percent of a stoichiometrically equivalent amount of an oxidant to oxidize thiosulfate to polythionate.

16. The process of claim 14 wherein said polythionate ion solution contains less than about 100 g/L thiosulfate.

17. The process of claim 1 wherein said gold-bearing eluate is produced by eluting said ion exchange resin with about 2 to about 20 bed volumes of polythionate ion solution.

18. The process of claim 1 wherein the slurry comprises a solid ore residue, a copper catalyst, a thiosulfate lixiviant and an ion exchange resin, the process comprising:
   transferring gold and copper to said ion exchange resin in said slurry;
   eluting copper from said resin with a thiosulfate eluant to produce a copper-bearing eluate;
   eluting gold from said resin by contact thereof with polythionate ions to produce a gold-bearing eluate; and,
   recovering gold from the gold-bearing eluate.

19. The process of claim 18 wherein said thiosulfate eluant contains between about 100 g/L and 200 g/L of a thiosulfate salt selected from the group comprising ammonium thiosulfate, calcium thiosulfate and sodium thiosulfate.

20. The process of claim 18 wherein said copper-bearing eluate is recycled and the copper used as a catalyst in leaching gold.

21. The process of claim 1 wherein the spent ion exchange resin is regenerated.

22. The process of claim 21 wherein the spent ion exchange resin is regenerated by contacting said resin with a solution of sulfide ions.

23. The process of claim 21 wherein the spent ion exchange resin is regenerated by contacting said resin with a solution of sulfite ions.

24. The process of claim 21 wherein spent ion exchange resin is contacted with a solution of sulfide or sulfite ions, thereby regenerating the resin and producing a regeneration product solution containing thio sulfate ions, and the regenerated resin is separated from regeneration product solution before being recycled for contacting aqueous gold-bearing slurry.

25. The process of claim 24 wherein the regenerated resin is recycled along with the regeneration product solution and contacted with aqueous gold-bearing slurry.

26. The process of claim 24 wherein the separated regeneration product solution is recycled for use in leaching gold.

27. The process of claim 1 wherein the barren eluate is recycled for use in the preparation of polythionate ion solution.

28. The process of claim 1 wherein the barren leachate is regenerated for use as a thiosulfate lixiviant.

29. The process of claim 1 wherein the solid ore residue comprising said aqueous gold-bearing slurry has been subjected to pressure oxidation.

30. A process for recovering gold from a thiosulfate leach solution containing a gold-bearing thiosulfate lixiviant, the process comprising:
   contacting the leach solution with an ion exchange resin having affinity for gold to adsorb gold onto said resin;
   eluting gold from said resin by contact thereof with polythionate ions to produce a gold-bearing eluate; and,
   recovering gold from the gold-bearing eluate.

31. The process of claim 30 wherein gold is recovered from the gold-bearing eluate by cementation with iron, zinc, copper, aluminum or reduction in solution with sodium borohydride.

32. The process of claim 30 wherein gold is recovered from the gold-bearing eluate by electrowinning.

33. The process of claim 30 wherein gold is recovered from the gold-bearing eluate by precipitation with sulfide ions.

34. The process of claim 30 wherein said ion exchange resin is a strong-base resin.

35. The process of claim 30 wherein said ion exchange resin is a weak base resin.

36. The process of claim 30 wherein said ion exchange resin is contacted with a polythionate ion solution having a concentration of about 20 g/L to about 250 g/L trithionate ions.

37. The process of claim 36 wherein said polythionate ion solution is prepared by contacting a thiosulfate solution with about 75 to about 100 percent of a stoichiometrically equivalent amount of an oxidant to oxidize thiosulfate to polythionate.

38. The process of claim 36 wherein said polythionate ion solution contains less than about 100 g/L thiosulfate.

39. The process of claim 30 wherein said ion exchange resin is contacted with a polythionate ion solution having a concentration of about 20 g/L to about 250 g/L tetrathionate ions.

40. The process of claim 39 wherein said polythionate ion solution is prepared by contacting a thiosulfate solution with about 75 to about 100 percent of a stoichiometrically equivalent amount of an oxidant to oxidize thiosulfate to polythionate.

41. The process of claim 39 wherein said polythionate ion solution contains less than about 100 g/L thiosulfate.

42. The process of claim 30 wherein said ion exchange resin is contacted with a polythionate ion solution comprising a mixture of trithionate and tetrathionate ions, said mixture having a concentration of about 20 g/L to about 250 g/L trithionate and tetrathionate ions.

43. The process of claim 42 wherein said polythionate ion solution is prepared by contacting a thiosulfate solution with about 75 to about 100 percent of a stoichiometrically equivalent amount of an oxidant to oxidize thiosulfate to polythionate.

44. The process of claim 42 wherein said polythionate ion solution contains less than about 100 g/L thiosulfate.

45. The process of claim 30 wherein said gold-bearing eluate is produced by eluting said ion exchange resin with about 2 to about 20 bed volumes of polythionate ion solution.

46. The process of claim 30 wherein the thiosulfate leach solution contains a gold-bearing and copper-bearing thiosulfate lixiviant and the ion exchange resin has an affinity for gold and copper, the process comprising:
   contacting said thiosulfate leach solution with an ion exchange resin to adsorb gold and copper from the lixiviant onto said resin;
   eluting copper from said resin with a thiosulfate eluant to produce a copper-bearing eluate;
   eluting gold from said resin by contact thereof with polythionate ions to produce a gold-bearing eluate; and,
   recovering gold from the gold-bearing eluate.

47. The process of claim 46 wherein said thiosulfate eluant contains between about 100 g/L and 200 g/L of a thiosulfate salt selected from the group comprising ammonium thiosulfate, calcium thiosulfate and sodium thiosulfate.

48. The process of claim 46 wherein said copper-bearing eluate is recycled and the copper used as a catalyst in leaching gold.

49. The process of claim 30 wherein the spent ion exchange resin is regenerated.

50. The process of claim 49 wherein the spent ion exchange resin is regenerated by contacting said resin with a solution of sulfide ions.

51. The process of claim 49 wherein the spent ion exchange resin is regenerated by contacting said resin with a solution of sulfite ions.

52. The process of claim 49 wherein spent ion exchange resin is contacted with a solution of sulfide or sulfite ions, thereby regenerating the resin and producing a regeneration product solution containing thiosulfate ions, and the regenerated resin is separated from the regeneration product solution before being recycled for contact with thiosulfate leach solution.

53. The process of claim 52 wherein the separated regeneration product solution is recycled for use in leaching gold.

54. The process of claim 30 wherein the barren eluate is recycled for use in the preparation of polythionate ion solution.

55. The process of claim 30 wherein the barren leachate is regenerated for use as a thiosulfate lixiviant.

56. A process for manufacturing a polythionate ion solution comprising contacting a thiosulfate solution with an oxidant in a reaction mixture to oxidize thiosulfate to a polythionate species, the concentration of oxidant added to the reaction mixture being characterized as between about 75 to about 100 percent of the stoichiometrically equivalent amount of oxidant required to oxidize the thiosulfate to said polythionate species.

57. The process of claim 56 wherein said oxidant is hydrogen peroxide and said polythionate ion solution contains trithionate ions.

58. The process of claim 56 wherein said oxidant is hydrogen peroxide and said polythionate ion solution contains a mixture of trithionate ions and tetrathionate ions.

59. The process of claim 56 wherein said oxidant is sulfur dioxide and said polythionate ion solution contains a mixture of trithionate ions and tetrathionate ions.

60. The process of claim 56 wherein said oxidant is either bromine or iodine and said polythionate ion solution contains primarily tetrathionate ions.

61. The process of claim 56 wherein said polythionate ion solution contains less than about 100 g/L thiosulfate.

62. The process of claim 56 wherein said polythionate ion solution has a concentration of about 20 g/L to about 250 g/L trithionate ions.

63. The process of claim 56 wherein said polythionate ion solution has a concentration of about 20 g/L to about 250 g/L tetrathionate ions.

64. The process of claim 56 wherein said polythionate ion solution comprises a mixture of trithionate and tetrathionate ions, said mixture having a concentration of about 20 g/L to about 250 g/L trithionate and tetrathionate ions.

65. A process for recovering gold from a gold-bearing eluate, the eluate produced by eluting gold from an ion exchange resin, the process comprising adding a solution of sulfide ions to the eluate to form an insoluble gold sulfide species.

66. The process of claim 65 wherein said gold-bearing eluate is produced by contacting an ion exchange resin with polythionate ion.

67. The process of claim 65 wherein said gold-bearing eluate is produced by contacting an ion exchange resin with thiocyanate.

* * * * *